United States Patent [19]

White et al.

[11] Patent Number: 4,682,850

[45] Date of Patent: Jul. 28, 1987

[54] OPTICAL FIBER WITH SINGLE ULTRAVIOLET CURED COATING

[75] Inventors: John S. White, Roanoke; A. Dahlgren Vaughan, Salem; Francis I. Akers, Roanoke, all of Va.

[73] Assignee: ITT Corporation, New York, N.Y.

[21] Appl. No.: 624,080

[22] Filed: Jun. 25, 1984

[51] Int. Cl.⁴ .............................................. G02B 6/44
[52] U.S. Cl. ............................................... 350/96.23
[58] Field of Search ........................... 350/96.23, 96.34

[56] References Cited

U.S. PATENT DOCUMENTS

| | | | |
|---|---|---|---|
| 4,472,021 | 9/1984 | Ansel et al. | 350/96.23 |
| 4,496,210 | 1/1985 | Ansel et al. | 350/96.30 |
| 4,514,037 | 4/1985 | Bishop et al. | 350/96.30 |
| 4,522,465 | 6/1985 | Bishop et al. | 350/96.30 |

Primary Examiner—William L. Sikes
Assistant Examiner—Frank Gonzalez
Attorney, Agent, or Firm—Peter C. Van Der Sluys

[57] ABSTRACT

An optical fiber coated with a single ultraviolet cured resin wherein the attenuation losses are less than 0.5 decibels/kilometer. The resin has a tensile modulus of about 7,800 psi. This cable is particularly useful in loosely wrapped cable structures such as open channel or loose tube cables.

11 Claims, 5 Drawing Figures

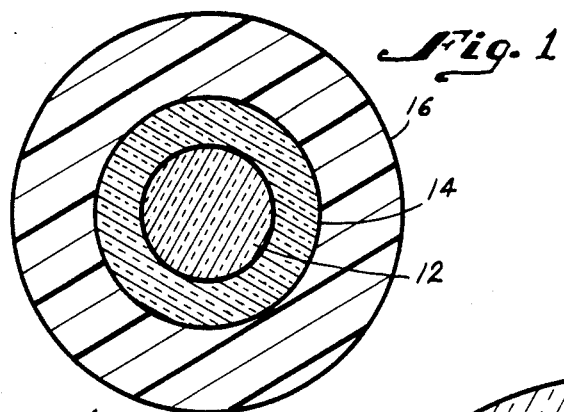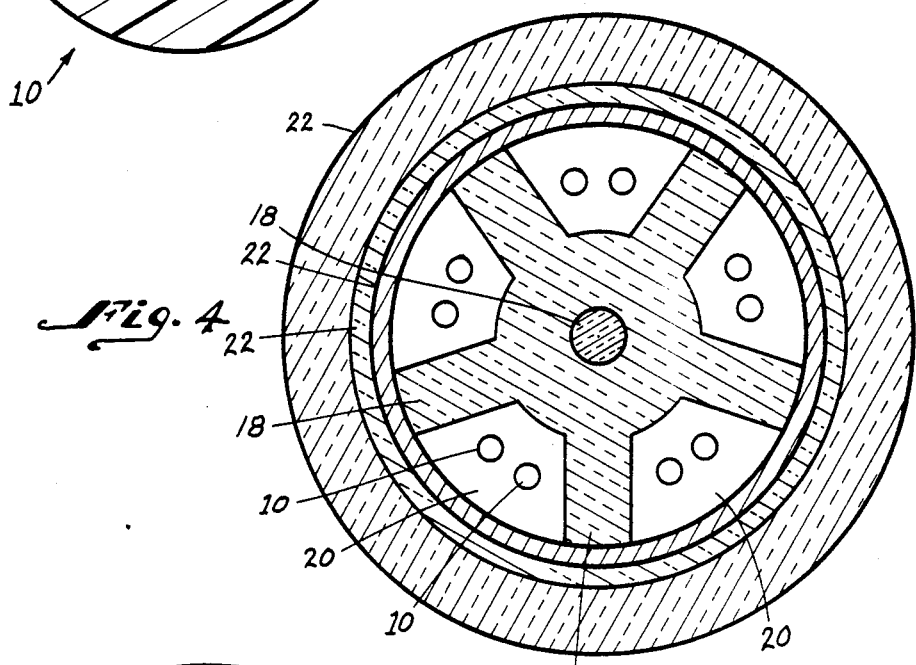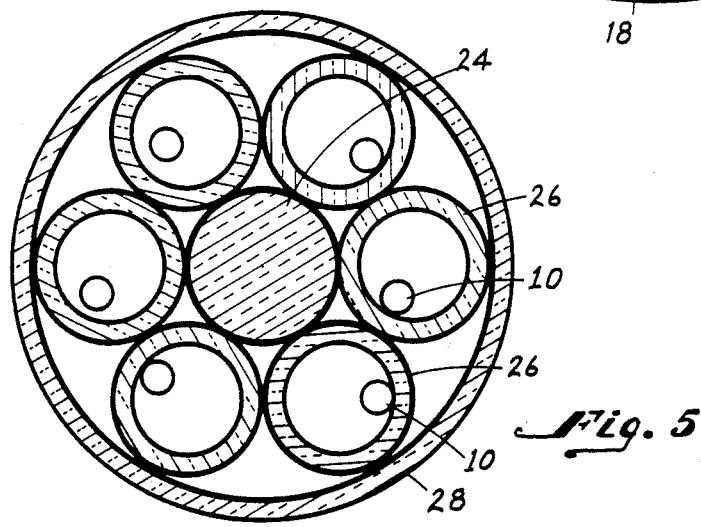

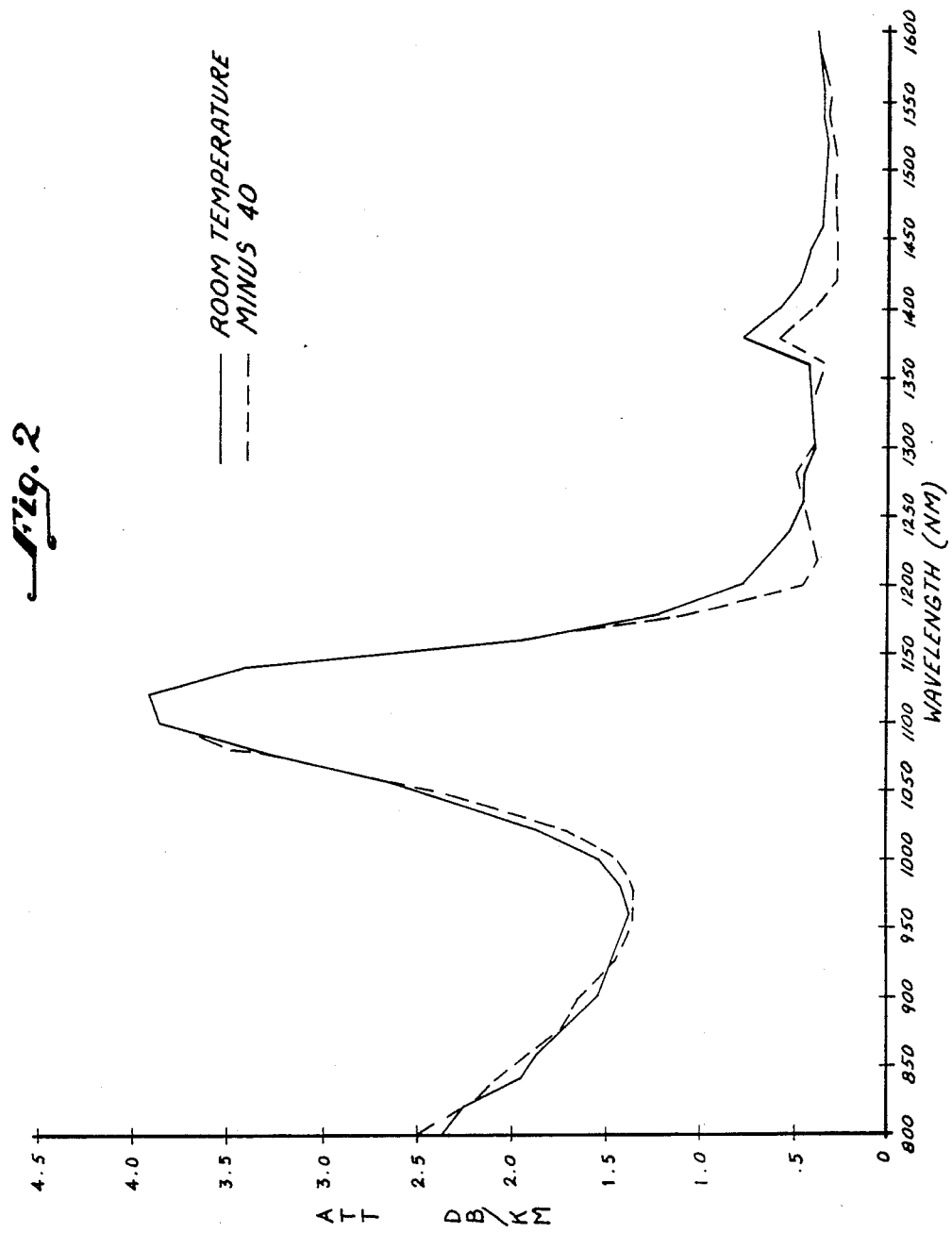

OPTICAL FIBER WITH SINGLE ULTRAVIOLET CURED COATING

FIELD OF THE INVENTION

This invention relates to optical fibers and more particularly to optical fibers coated with a single ultraviolet-cured resin and which is particularly useful in cables where the fibers are loosely contained.

There are various combinations of coating materials currently used to protect optical fibers, preserve their strength and protect them from microbending induced optical losses. The most usually used coating arrangement is a dual layer coated system including an inner layer comprising a relatively soft material to cushion the fiber and reduce microbending losses and an outer layer comprising a much harder material for high strength and abrasion resistance. Examples of inner layer materials include silicones, hot wax materials and soft ultraviolet cured resins; examples of outer layer materials include thermally cured polymeric materials and hard ultraviolet cured resins. In recent years the ultraviolet-cured resins have become widely used materials for a variety of reasons including their ease of application.

At this time one of the most commonly used coating arrangements includes the use of a high tensile modulus ultraviolet cured resin over a low tensile modulus ultraviolet cured resin. High modulus materials are considered to be those having a tensile modules of 10,000 psi and greater and low modulus materials are considered to be those having a modulus of 1,000 psi and lower when the modulus is measured at 25° C. with 2½% strain on the fiber. One such system has an outer layer having modulus of about 120,000 psi and a Shore D hardness of about 72, and an inner layer having a modulus of about 350 psi and a Shore A hardness of about 50 to 55. This system has worked generally satisfactorily. The high modulus outer layer has afforded sufficient protection for the fiber and has made the fiber easy to cable; the low modulus material has given satisfactory results in the critical requirement of minimizing microbending losses of optical power over the required temperature range of $-40°$ to $+60°$ Celsius.

The problem with this coating arrangement is that it is relatively expensive in that two materials are used and applied.

SUMMARY OF THE INVENTION

It is an object of this invention to provide an optical fiber having a single coating that satisfactorily protects the fiber, is relatively easy to cable and that minimizes microbending losses over a wide temperature range.

This object is accomplished by providing an optical fiber having a core and an outer cladding. The cladding is coated with only a single ultraviolet-cured material having tensile modulus in the range of about 1,000 to about 10,000 psi. Preferably, the modulus is about 7,800 psi at 25° C. and the material has a Shore A hardness of about 70 to about 75.

BRIEF DESCRIPTION OF THE DRAWING

For a better understanding of the invention, reference is made to the following Detailed Description of a Preferred Embodiment taken in conjunction with the figures of the accompanying drawing in which:

FIG. 1 is a cross section of an optical fiber coated with a single layer of ultraviolet-cured resin in accordance with this invention;

FIG. 2 is a graph showing the fiber attenuation losses versus wavelength of the light being transmitted for a single mode fiber having a coating arrangement consisting of two ultraviolet cured resins;

FIGS. 4 and 5 are cross-sections of the fiber shown in FIG. 1 used in an open channel and a loose tube cable construction respectively.

DETAILED DESCRIPTION OF A PREFERRED EMBODIMENT

Figure 3:
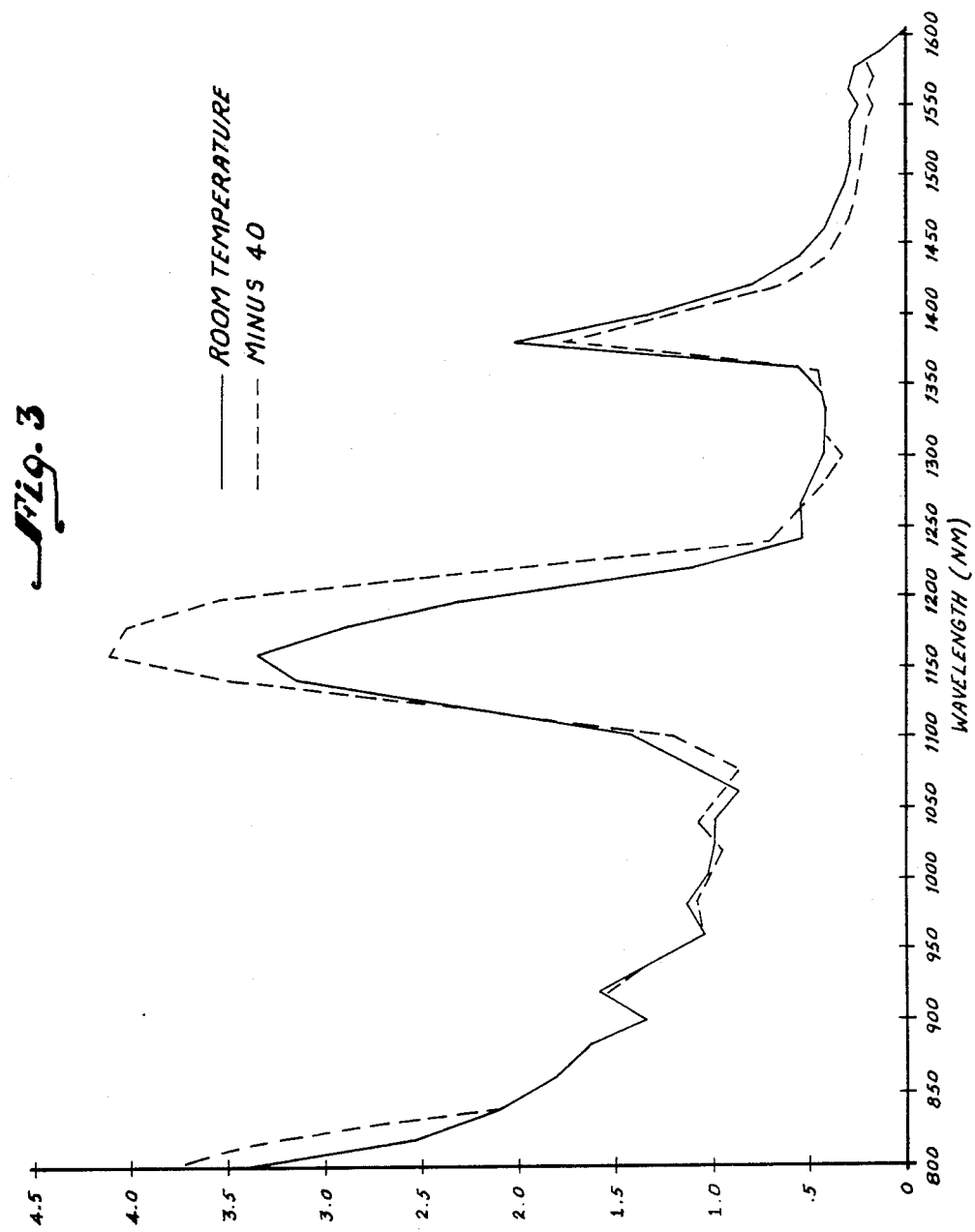
FIG. 3 is a graph showing the fiber attenuation versus wavelength of the light being transmitted for a single mode fiber having a coating in accordance with this invention.

In FIG. 1 there is illustrated a coated optical fiber 10 in accordance with this invention. The fiber 10 includes a core 12 and cladding 14 which can be any usual single or multimode type. In this embodiment the fiber 10 is a single mode fiber. The core is fused silica ($SiO_2$) doped with germania ($GeO_2$) and has a diameter of about 9 microns; the cladding is also fused silica, but is doped with flourine, germania and phosphorous, and has a thickness such that the fiber has a diameter of 125 microns. The index of refraction of the core is higher than that of the cladding. In this embodiment the index of refraction of the core is about 1.4626 and that of cladding is 1.45709

Around the cladding 14 there is a single coating 16 of ultraviolet-cured coating resin having a thickness of about 62.5 microns so that the coated fiber 10 has a diameter of 250 microns. The coating can be as thick as desired, but this is dictated by the constraints of placing fibers in a cable structure and by the constraints of connectors used to join the cables. It is believed that the coating should not be less than 50 microns thick.

The ultraviolet-cured resin has a tensile modulus of about 7800 psi measured at 25° Celsius and 50% relative humidity with a 2½% strain in the fiber. It is believed that this modulus can be within a range of about 1,000 to 10,000 psi. The resin has a Shore A hardness of between 70 to 75.

An example of a resin usable for coating 16 is manufactured by De Soto, Inc. of Des Plains, Ill. under the designation De Soto 131.

Published exemplary characteristics of the DeSoto 131 coating are as follows:

|  | TYPICAL PROPERTIES |
| --- | --- |
| LIQUID COATING AT 25° C. |  |
| Density, g/cc | 1.10 |
| Viscosity, mPa · s | 7000 |
| CURED COATING AT 25° C. 50% RELATIVE HUMIDITY* |  |
| Elongation, % | 45 |
| Tensile Strength, MPa | 12 |
| Shrinkage on Curing, % | 5.0 |
| Refractive Index | 1.54 |
| Cure Speed, % Cure at 0.5 J/cm$^2$ (Ratio of 0.5 J/cm$^2$ to full cure modulus) | 50 |
| ADHESION TO GLASS |  |
| 50% Relative Humidity, g | 38 |
| 95% Relative Humidity, g | 4 |

The resin can be applied in any conventional manner by drawing the fiber through a dipcoater containing the resin in liquid form. This coats the fiber with the wet resin which is then passed through an ultraviolet radiator to cure the resin.

The fiber 10 (a single mode fiber with a De Soto 131 coating) has been tested for attenuation losses at room temprerature and at −40° Celsius. The results are shown in FIG. 3 with the attenuation plotted on the vertical axis in decibels/kilometer and the wavelength of the light being transmitted plotted on the horizontal axis in nanometers. The results of room temperature are shown in solid lines and at −40° C. in dotted lines. Note that at the usually transmitted light frequencies, namely, 1300 and 1550 nanometers, there is very little difference in attenuation. It is believed that this minimal difference extends to +60° Celsius so that the attenuation is relatively constant from −40° C. to +60° C.

Similar tests were conducted on single mode fiber purchased from Corning Glass Works. This fiber has two ultraviolet coatings, one of low modulus and one of high modulus. The results of this test are shown in the graph of FIG. 2 which is similarly laid out to the graph of FIG. 3. Again the room temperature results are shown in solid lines and the results at 31 40° Celsius are shown in dotted lines. Note the attenuation at 1300 and 1550 nanometers. The attenuation for both fibers and both wavelengths at both temperatures is less than 0.5 decibels/kilometer.

The fiber 10 has been cabled in a loose fitting cable structure, that is, one where the cabling is not tightly wrapped around the fibers. The fiber 10 has been tested in an open channel cable of the type illustrated in FIG. 4 with no significant or unusual degradation of its attenuation performance. It was found that the coating 16 afforded sufficient protection for the fiber during the cabling process and was not so tacky as to impede the relative motion of the fiber and cabling material. It is believed that the same results would be obtained in loose tube cable. However, it is not believed that such satisfactory results would be obtained if the fiber 10 were placed in a tight wrapped cable.

In FIG. 4, the open channel can be can be seen to include a core means 18 having grooves 20 extending in helical fashion along its length. The fibers 10 are loosely laid in the grooves 20 and have a slightly longer length than the core means 18 so that they feel no external stress applied to the cable. This stress is taken up by the core means 18. Around the core means 18 suitable jacketing materials 22 are applied. Various such cables are known in the art and reference is made to copending application of John C. Smith et al. filed Oct. 5, 1983 for Dielectric Strength Member for Slotted Optical Cables and assigned Ser. No. 539,220.

An example of loose tube cable constructions is found in copending application Ser. No. 539,344 filed by C. Blanco et al. on Oct. 5, 1982 for Dielectric Strength Element for Loose Tube Optical Fiber Cable. These cables include a core means 24 having tubular members 26 wrapped therearound. The fibers 10 are loosely laid in the tubular members 26 and have a slightly longer length so that they feel no external stress applied to the cable. Suitable jacketing materials 28 are applied around the core means.

While in the foregoing there has been described a preferred embodiment of the invention, various changes and modifications can be made within the scope of the appended claims.

We claim:

1. An optical fiber comprising a core and a cladding formed of similar materials, the core having a higher index of refraction than the cladding, and a single layer of ultraviolet cured resin having a thickness of at least 50 microns around said cladding, said single layer of ultraviolet cured resin exhibiting a tensile modulus in the range of about 1,000 psi to 10,000 psi, said fiber having attenuation losses of less than about 0.5 decibels/kilometer at room temperature and at −40° C. Celsius when transmitting light at about 1,300 or about 1,550 nanometers and otherwise being buffered by said single layer in a manner similar to a double coated optical fiber.

2. An optical fiber in accordance with claim 1 wherein said resin has a tensile modulus of about 7,800 psi.

3. An optical fiber in accordance with claim 2 wherein said resin has a Shore A hardness of about 70 to 75.

4. An optical fiber comprising a core and a cladding formed of fused silica, the core having an index of refraction higher than the cladding, and a single layer of ultraviolet cured resin around said cladding, said single layer having a thickness of at least 50 microns, said resin having a tensile modulus of about 1,000 psi to about 10,000 psi and said single layer buffering said optical fiber in a manner similar to a double coated optical fiber.

5. An optical fiber in accordance with claim 4 wherein said resin has a modulus of about 7,800 psi.

6. The optical fiber in accordance with claim 5 wherein said resin has a Shore A hardness of about 70 to 75.

7. An optical fiber in accordance with claim 4 wherein the attenuation losses of said fiber are relatively constant from about −40° Celsius to about +60° Celsius.

8. An optical fiber cable comprising an optical fiber having a single layer of ultraviolet cured resin therearound, said single layer having a thickness of at least 50 microns and exhibiting a Shore A hardness of about 70 to 75 and a tensile modulus in the range of about 1,000 to 10,000 psi, said optical fiber having attenuation losses of less than about 0.5 decibels/kilometer when transmitting at about 1,300 nanometers or about 1,550 nanometers, and otherwise being buffered by said single layer in a manner similar to a double coated optical fiber and a cable structure, said optical fiber being loosely contained in said cable structure.

9. An optical fiber cable in accordance with claim 8 wherein said cable structure is open channel cable.

10. An optical fiber cable in accordance with claim 8 wherein said cable structure is loose tube cable.

11. An optical cable in accordance with claim 8 wherein said resin has a tensile modulus of about 7800 psi.

* * * * *